US012586968B2

(12) United States Patent
Utermoehlen et al.

(10) Patent No.: US 12,586,968 B2
(45) Date of Patent: Mar. 24, 2026

(54) ADAPTER HAVING A FIRST PLUG CONNECTOR PART FOR ELECTRICAL AND MECHANICAL CONNECTION TO A CABLE AND A SECOND PLUG CONNECTOR PART FOR ELECTRICAL AND MECHANICAL CONNECTION TO AN ELECTRICAL AND/OR ELECTRONIC DEVICE

(71) Applicant: HELLA GmbH & Co. KGaA, Lippstadt (DE)

(72) Inventors: Fabian Utermoehlen, Lippstadt (DE); Clemens Massmann, Wadersloh (DE); Volker Woessmann, Telgte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 474 days.

(21) Appl. No.: 18/124,218

(22) Filed: Mar. 21, 2023

(65) Prior Publication Data

US 2023/0223728 A1 Jul. 13, 2023

Related U.S. Application Data

(63) Continuation of application No. PCT/EP2021/075048, filed on Sep. 13, 2021.

(30) Foreign Application Priority Data

Sep. 21, 2020 (DE) ..................... 10 2020 124 502.5

(51) Int. Cl.

*H01R 31/06* (2006.01)
*H01R 13/52* (2006.01)
*H01R 13/639* (2006.01)

(52) U.S. Cl.

CPC ....... *H01R 31/065* (2013.01); *H01R 13/5219* (2013.01); *H01R 13/6397* (2013.01); *H01R 2201/26* (2013.01)

(58) Field of Classification Search

None

See application file for complete search history.

(56) References Cited

U.S. PATENT DOCUMENTS 8,647,154 B2 * 2/2014 Chang .................. H04W 88/00 439/638
8,794,987 B2 * 8/2014 Classen ............. H01R 13/5219 439/189

(Continued)

FOREIGN PATENT DOCUMENTS

CN 105826780 A 8/2016
CN 107658615 A 2/2018

(Continued)

OTHER PUBLICATIONS

International Search Report dated Dec. 23, 2021 in corresponding application PCT/EP2021/075048.

*Primary Examiner* — Tho D Ta

(74) *Attorney, Agent, or Firm* — Muncy, Geissler, Olds & Lowe, P.C.

(57) ABSTRACT

An adapter, including a first plug connector part for electrical and mechanical connection to a cable, a second plug connector part for electrical and mechanical connection to an electrical and/or electronic device, and a housing. The first and second plug connector parts being provided in or on a wall of the housing or being part of the housing. The adapter including at least one matching circuit, which is connected to contacts of the first and second plug connector parts via electrical lines.

14 Claims, 2 Drawing Sheets

(56) References Cited

U.S. PATENT DOCUMENTS

| | | | | |
|---|---|---|---|---|
| 9,075,425 | B2 * | 7/2015 | Burrell | H01R 29/00 |
| 9,627,903 | B2 * | 4/2017 | Schwartz | H02J 7/00 |
| 10,261,934 | B2 | 4/2019 | Lim | |
| 2006/0194467 | A1 * | 8/2006 | Beasley | H01R 13/6641 439/339 |
| 2010/0081337 | A1 | 4/2010 | Dorogusker et al. | |
| 2010/0123591 | A1 | 5/2010 | Bauschke et al. | |
| 2013/0178093 | A1 | 7/2013 | Altice et al. | |
| 2017/0052921 | A1 | 2/2017 | Duffy et al. | |
| 2018/0136410 | A1 | 5/2018 | Takeuchi et al. | |
| 2019/0204882 | A1 * | 7/2019 | Tseng | G06F 1/266 |
| 2021/0265794 | A1 | 8/2021 | Diessi et al. | |

FOREIGN PATENT DOCUMENTS

| | | | | |
|---|---|---|---|---|
| DE | 60200575 | T2 | 9/2004 | |
| DE | 202004005187 | U1 | 11/2004 | |
| DE | 202009009254 | U1 | 9/2009 | |
| DE | 202015100583 | U1 * | 3/2015 | H01R 31/065 |
| DE | 102015102531 | A1 * | 8/2016 | H01R 31/065 |
| EP | 1357645 | A1 | 10/2003 | |
| EP | 3104280 | A1 | 12/2016 | |
| EP | 3501883 | A1 * | 6/2019 | B60L 53/18 |
| EP | 3671971 | A1 | 6/2020 | |
| KR | 20120009890 | A * | 2/2012 | H01R 31/065 |
| KR | 101233490 | B1 | 2/2013 | |
| KR | 102080435 | B1 * | 2/2020 | H02J 50/10 |
| WO | WO2020094390 | A1 | 5/2020 | |

* cited by examiner

ADAPTER HAVING A FIRST PLUG CONNECTOR PART FOR ELECTRICAL AND MECHANICAL CONNECTION TO A CABLE AND A SECOND PLUG CONNECTOR PART FOR ELECTRICAL AND MECHANICAL CONNECTION TO AN ELECTRICAL AND/OR ELECTRONIC DEVICE

This nonprovisional application is a continuation of International Application No PCT/EP2021/075048, which was filed on Sep. 13, 2021 and which claims priority to German Patent Application No 10 2020 124 502.5, which was filed in Germany on Sep. 21, 2020, and which are both herein incorporated by reference.

BACKGROUND OF THE INVENTION

Field of the Invention

The invention relates to an adapter for a motor vehicle, including a first plug connector part for electrical and mechanical connection to a cable; a second plug connector part for electrical and mechanical connection to an electrical and/or electronic device; and a housing, the first and second plug connector parts being provided in or on a wall of the housing or being part of the housing. The invention further relates to an arrangement for a motor vehicle made up of the adapter and a device, in particular including a second or an actuator.

Description of the Background Art

A multiplicity of actuators and sensors are installed in motor vehicles. They are connected to other devices, for example control devices, via cables. The devices installed in the motor vehicles, in particular the sensors and actuators, are to be installed in as many motor vehicles as possible, so that the tool, development, testing, and certification costs of each device may be as low as possible. However, adaptations or new developments of devices, in particular of sensors and actuators, are frequently necessary, since the motor vehicle models in which they are used are changed or new motor vehicle models developed. Some motor vehicles are also manufactured only in small quantities. Up to now, many of the changes to the motor vehicle models or the developments of new motor vehicle models have made it necessary to change the devices used in the motor vehicles or to develop new ones. In addition, testing and certification methods had to be carried out for each modified or new device, which not only takes time but also incurred costs.

SUMMARY OF THE INVENTION

It is therefore an object of the invention to make the development, testing, and certification of new devices unnecessary was the object underlying the invention.

This object is achieved according to an exemplary embodiment of the invention in that an adapter having the features mentioned at the outset is further developed in such a way that it includes a matching circuit. If an adapter according to the invention is used in an arrangement including a device, such as a sensor or an actuator, this arrangement has different properties than it would have if it included the device without the adapter, due to the matching circuit. As a result, the device, in particular the sensor or the actuator, may be adapted to changes in motor vehicle models or to other motor vehicle models. A modification of the device itself is not necessary for this purpose. Complex new developments, licensing, certifications, and testing may be dispensed with.

Under certain circumstances, however, the adapter must be developed, approved, certified, and tested. Nevertheless, since an adapter according to the invention may ideally be used for different devices, the development, approval, certification, or testing is then more economical than in the case of a device, in particular a sensor or an actuator, which may possibly be used in only one motor vehicle model.

The matching circuit may include a control unit or regulating unit, which ascertains an actuating signal from a reference variable, which may be read into the matching circuit via the first plug connector part, and provides the actuating signal at the second plug connector part. This makes it possible to use an actuator in a control device, in which neither the control device nor the actuator comprises a control unit or a regulating unit. The control device then supplies the reference variable to the adapter, and the adapter ascertains an actuating signal from the reference variable and, if necessary, a further variable or multiple further variables and supplies it to the actuator.

The matching circuit may include a sensor element, with the aid of which a measured variable may be detected and converted into a sensor signal, and which is electrically connected to the control unit or regulating unit, the control unit or regulating unit also ascertaining the actuating signal as a function of the sensor signal.

However, even if the matching circuit does not include a control unit or regulating unit, the matching circuit may include a sensor element, with the aid of which a measured variable may be detected and converted into a sensor signal. The sensor element may provide the sensor signal at the first and/or second plug connector part. The sensor signal may then be read into a device, in particular the sensor or the actuator, or it may be provided via a cable connected to the first plug connector part.

Sensors in motor vehicles usually provide only one sensor variable (e.g., a temperature, a pressure, a position, an acceleration, etc.). When used in a different vehicle model, however, it may be necessary to make additional sensor variables available. For this purpose, the sensor element provided in the matching circuit of the adapter may be used, whose sensor signal is made available to the plug connector parts of the adapter.

In an adapter according to the invention, a matching circuit may include a converter, which generates, from a first signal having a first piece of information, which may be read into the matching circuit via the first plug connector part, a second signal having the first piece of information and provides the second signal at the second plug connector part and/or generates, from a third signal having a second piece of information, which may be read into the matching circuit via the second plug connector part, a fourth signal having the second piece of information and provides the fourth signal at the first plug connector part.

The converter makes it possible to convert a signal according to one protocol into a signal according to another protocol. Devices, such as sensor or actuators, which have an interface which is adapted to a particular protocol, are enhanced for connection to bus system designed according to another protocol. An adapter may preferably be used to carry out the adaptation to different protocols. The adapter may be designed in such a way that a user may select the protocols for which the adapter is suitable on the side of the first plug connector part and also on the side of the second plug connector part.

The matching circuit of an adapter according to the invention may include an encryption circuit. This may be advantageous for decrypting a first piece of a first signal, which may be read into the matching circuit via the first plug connector part, and generating a second signal having the decrypted first piece of information, and providing the second signal at the second plug connector part and/or encrypting a second piece of information from a third signal, which may be read into the matching circuit via the second plug connector part, and generating a fourth signal having the encrypted second piece of information, and providing the fourth signal at the first plug connector part.

Many sensors or actuators in motor vehicles are currently equipped with simple interfaces for communication purposes. This interfaces may, under certain circumstances, be manipulated via additional electronics, to modify the data sent or received by the sensor or actuator. Sensors and/or actuators may be made more secure thereby, in that only an encrypted communication with the sensor or actuator is possible with the aid of the adapter.

In an adapter according to the invention, a matching circuit may include a protective circuit for protecting the device connected to the second plug connector part against overvoltages and/or overcurrents. The protective circuit may include a suppressor diode as the protective element for discharging overvoltages. A protective circuit of this type may adapt a device, in particular a sensor or an actuator which was developed for a motor vehicle, e.g., having a 12-volt vehicle electrical system and supplied with a voltage of, e.g., 5 volts, to a use in a vehicle electrical system having a higher voltage of, for example, 48 volts, so that, for example, a short-circuit is unable to damage the device.

The object underlying the invention is also achieved in that, in the case of an adapter of the type mentioned at the outset or an aforementioned adapter according to the invention, the housing is sealed, and the second plug connector part includes sealing elements, which seal a complementary plug connector part of the device connected to the second plug connector part against the surroundings. The background of this approach according to the invention is that different motor vehicle manufacturers impose different requirements on devices, in particular sensors and actuators. Some require the devices used in a motor vehicle to be encapsulated for protection against their surroundings, which is implemented, for example, by welded-on covers. On the one hand, the residual amount of enclosed air undergoes a cyclical expansion and compression, primarily due to temperature changes, which may result in the cracking of the device, and, on the other hand, water condensation may precipitate, which has a negative effect on the device performance or destroys the device. To avoid damage, diaphragms or valves may be used in the housing of the device or cavities or narrow channels in the plug region. They may facilitate a venting along contact pins, which, for this purpose, do not terminate with the surrounding plastic of the housing. For some devices, a venting via the plug is possible, while in other devices, the more expensive approach using a diaphragm or a valve must be selected, and the connector must be sealed. With the same electrical properties, two different variants of a device may therefore have to be developed, approved, certified, and tested. To avoid this, the adapter according to the invention may be used, which is sealed and which also seals the connected device. The adapter preferably includes a pressure compensating element, for example a diaphragm inserted into a housing wall, a valve, or a pressure compensating cavity.

An adapter according to the invention may be designed in such a way that the first and second plug connector parts of the adapter are complementary with respect to each other. This is always the case if the first and second plug connector parts comply with one standard. However, it is also possible that the first plug connector part and the second plug connector part are not complementary and belong to different plug connector systems which are defined in different standards.

An adapter according to the invention may have a mechanical securing action against being separated from the device. This is useful, in particular, if the adapter includes a matching circuit, with the aid of which an encryption and/or a decryption of signals or information is possible.

The matching circuit of an adapter according to the invention may include a diagnostic circuit, with the aid of which a signal present at the first plug connector part and/or at the second plug connector part may be tested. A signal which indicates the result of the test may be provided at the first plug connector part and/or at the second plug connector part.

The adapter may include multiple second plug connector parts, each for connection to one device. Multiple devices may then be connected to the cable simultaneously via this adapter.

An adapter according to the invention may form an arrangement according to the invention together with a device, the device being a sensor or an actuator. The device then includes a first plug connector part, which is electrically and mechanically connected to the second plug connector part of the adapter.

The arrangement may also include a cable, it being possible to provide a second plug connector part on the cable, which is electrically and mechanically connected to the first plug connector part of the adapter.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
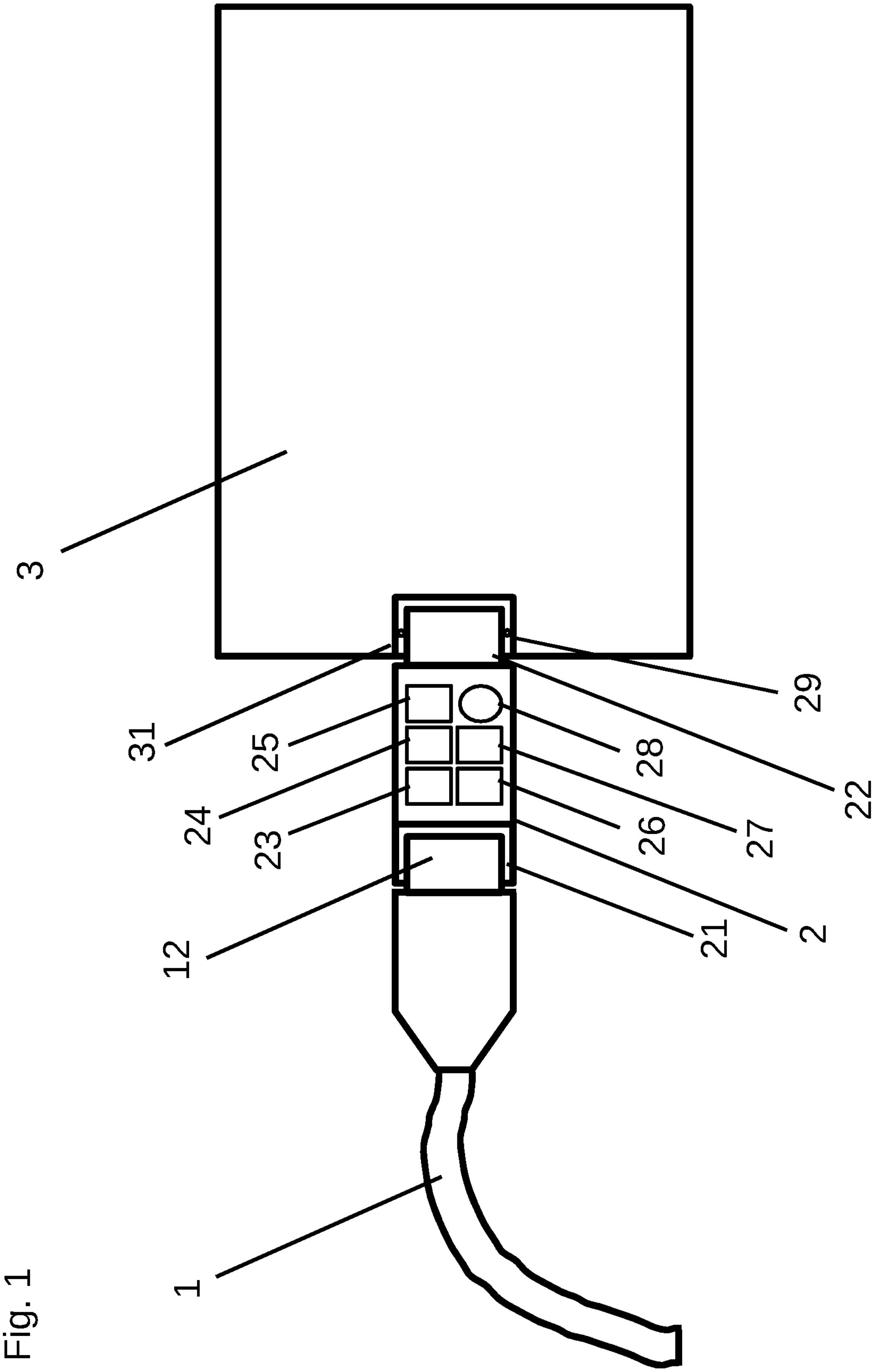
FIG. 1 is a schematic representation of an arrangement made up of a cable, an adapter, and an actuator.

The arrangement illustrated in FIG. 1 comprises a cable as cable 1 and an actuator as actuator 3, which are not equipped or configured in any particular way for the embodiment of the invention. The cable may be a bus cable of the type used in motor vehicles. The actuator may be an actuator of the type used in motor vehicles.

Cable 1 is not illustrated in its entirety. It includes a second plug connector part 12 on one illustrated end. Actuator 3 includes a housing. A first plug connector part 31 is inserted into a wall of the housing. Actuator 3 is connected to cable 1 via this first plug connector part 31.

Adapter 2 is provided between cable 1 and actuator 3 and provides the arrangement with additional capabilities. The adapter includes a matching circuit 23, 24, 25, 26, 27 for this purpose. Adapter 2 includes a first plug connector part 21, which is complementary with respect to second plug connector part 12 of cable 1. First plug connector part 21 of adapter 2 and second plug connector part 12 of the cable are mechanically and electrically connected to each other. The adapter also includes a second plug connector part 22, which is complementary with respect to first plug connector part 31 of the actuator. Second plug connector part 22 of the adapter and first plug connector part 31 of actuator 3 are mechanically and electrically connected to each other. Actuator 3 is connected to cable 1 via adapter 2.

First plug connector part 31 of adapter 3 may be designed for a venting of the housing of the adapter. The venting may be achieved in that the plug contacts of first plug connector part 31 are not tightly surrounded by a holder of the plug connector part, so that a channel is formed between the holder and the plug contact, via which air may flow into the housing and out of the housing for the purpose of pressure compensation. Moisture may penetrate the housing via this channel. If this is not desirable, it may be prevented with the aid of adapter 2. The plug connection between adapter 2 and actuator 3 is designed in such a way that the plug contacts of first plug connector part 31 of actuator 2 are enclosed by second plug connector part 22 of adapter 2. Second plug connector part 22 of adapter 2 includes a sealing element 29, which seals a gap between second plug connector part 22 of adapter 2 and plug connector part 31 of actuator 3. Adapter 2 does not have any venting openings, via which a pressure compensation could take place or via which moisture could penetrate adapter 2 and also the actuator via adapter 2. To prevent damage to adapter 2 or actuator 3 despite the lack of venting openings, a diaphragm 28 is inserted into a wall of adapter 2, via which the pressure compensation takes place. To compensate pressure, the diaphragm may bulge inwardly or outwardly.

A control unit or regulating unit 23 may be provided in the matching circuit. It may read in a reference variable and, if necessary, a control variable via cable 1 to determine a manipulated variable therefrom. This manipulated variable may then be transmitted to actuator 3 via plug connection 22, 31. Actuator 3 may process the manipulated variable.

A converter 24 may be provided in the matching circuit, with the aid of which signals according to a first protocol, which are to be transmitted from arbitrary devices to actuator 3 via cable 1, are converted into signals according to a second protocol, and/or signals according to the second protocol, which are to be transmitted from actuator 2 to arbitrary devices via cable 1, are converted into signals according to the first protocol.

A protective circuit 25 may be provided in the matching circuit, which may be suitable and provided, in particular, for protecting actuator 3 against overvoltages when it is connected to a vehicle electrical system having a voltage which is higher than the voltage of a vehicle electrical system for which it was designed. The protective circuit may be a suppressor diode.

The matching circuit may include an encryption unit 26, which makes it possible to encrypt and decrypt information in signals. Non-encrypted information in signals which are to be transmitted from actuator 3 to an arbitrary device via cable 1 may thus be encrypted in adapter 2 to then be transmitted via the cable in encrypted form. Conversely, encrypted information in signals, which are transmitted to actuator 3 via cable 1, may be decrypted in encryption unit 26 of adapter 2, so that the actuator may process the decrypted information.

A sensor element 27 may be provided in the matching circuit. A physical variable may be detected with the aid of this sensor element 27. It may be transmitted to other devices via plug connection 21, 12 and cable 1 or to the actuator via plug connection 22, 31.

Figure 2:
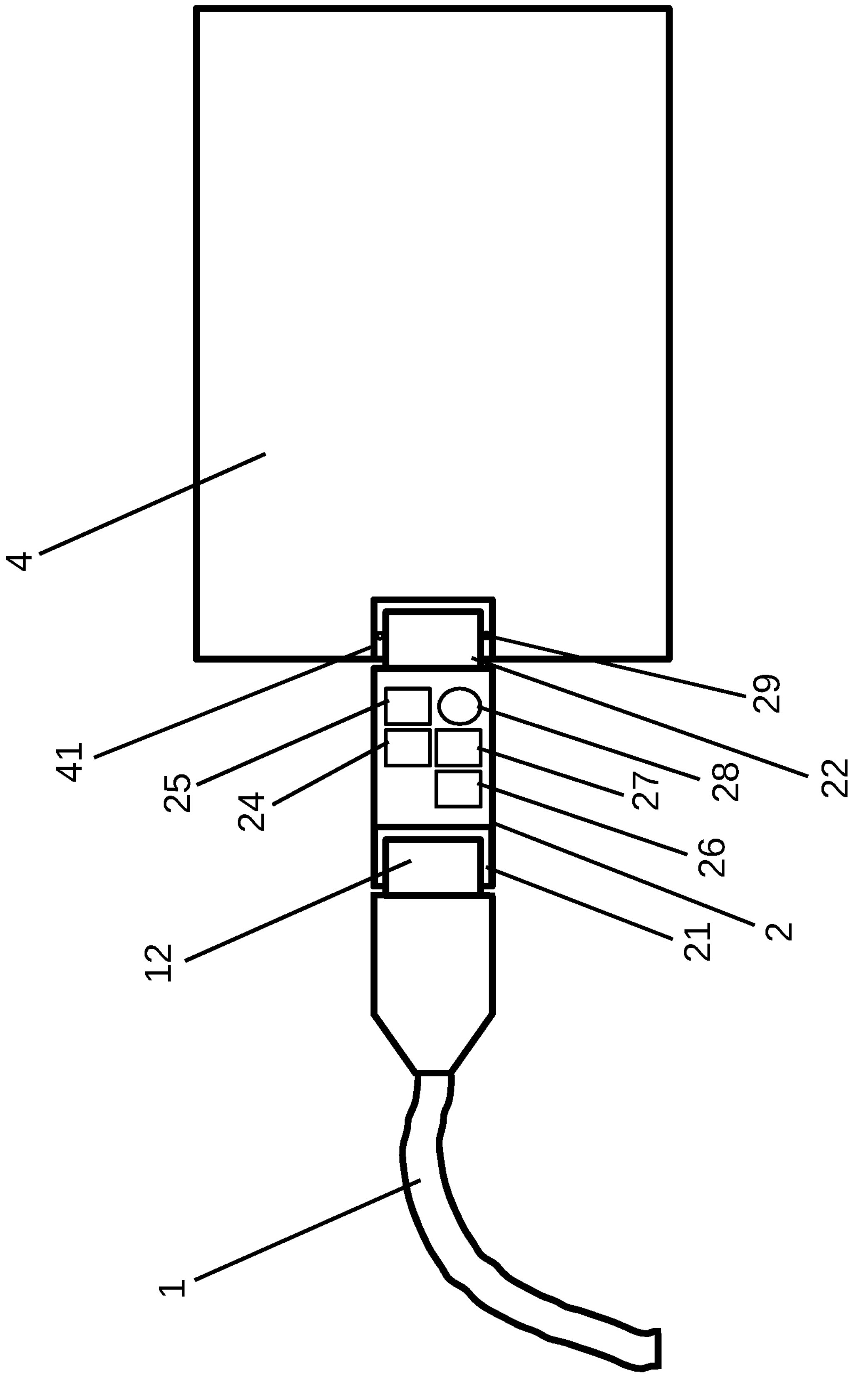
FIG. 2 is a schematic representation of an arrangement made up of a cable, an adapter, and a sensor.

Adapter 2, which is situated between cable 1 and sensor 4 in the arrangement according to FIG. 2, has almost the same properties as adapter 2 of the arrangement illustrated in FIG. 1. The same parts and units of adapter 2 as well as cable 1 are identified by the same reference numerals.

Like actuator 3, sensor 4 includes a housing, in which the parts and units of sensor 4 are arranged. A first plug connector part 41 is arranged in a wall of the housing. Via this first plug connector part 41, sensor 4 is connected to adapter 2 in the same way as in the arrangement of sensor 3 according to FIG. 1.

Adapter 2 of the arrangement according to FIG. 2 differs from adapter 2 of the arrangement according to FIG. 1 only in that the matching circuit of the arrangement according to FIG. 2 does not include a control or regulating unit 23. Converter 24, protective circuit 25, encryption unit 26, sensor element 27, and/or diaphragm 28 may be provided in the case of the matching circuit of adapter 2 of the arrangement according to FIG. 2 and have the same functions and properties as already described for the arrangement from FIG. 1.

The invention being thus described, it will be obvious that the same may be varied in many ways. Such variations are not be regarded as departure from the spirit and scope of the invention, and all such modifications as would be obvious to one skilled in the art are to be included within the scope of the following claims.

What is claimed is:

1. An adapter comprising:

a first plug connector part for electrical and mechanical connection to a cable;

a second plug connector part for electrical and mechanical connection to an electrical and/or electronic device;

a housing, the first and second plug connector parts are provided in or on a wall of the housing or are part of the housing; and at least one matching circuit connected to contacts of the first and second plug connector parts via electrical lines, wherein the at least one matching circuit includes a sensor element that detects a measured variable, converts the measured variable into a sensor signal and provides the sensor signal to the first plug connector part and/or the second plug connector part.

2. The adapter according to claim 1, wherein the at least one matching circuit includes a converter that generates, from a first signal having a first piece of information, which is read into the at least one matching circuit via the first plug connector part, a second signal having the first piece of information and provides the second signal to the second plug connector part, and/or generates, from a third signal having a second piece of information, which is read into the at least one matching circuit via the second plug connector part, a fourth signal having the second piece of information and provides the fourth signal to the first plug connector part.

3. The adapter according to claim 1, wherein the at least one matching circuit includes an encryption unit that encrypts a first piece of information from a first signal, which is read into the at least one matching circuit via the first plug connector part and generates a second signal having the encrypted first piece of information and provides the second signal to the second plug connector part and/or encrypts a second piece of information from a third signal, which is read into the at least one matching circuit via the second plug connector part, and generates a fourth signal having the encrypted second piece of information and provides the fourth signal to the first plug connector part.

4. The adapter according to claim 1, wherein the at least one matching circuit includes a protective circuit for protecting the electrical and/or electronic device connected to the second plug connector part against overvoltages and/or overcurrents.

5. The adapter according to claim 1, wherein the housing is sealed, and the second plug connector part includes sealing elements that seal a complementary plug connector part of the electrical and/or electronic device connected to the second plug connector part against the surroundings.

6. The adapter according to claim 1, wherein the first and second plug connector parts of the adapter are complementary with respect to each other.

7. The adapter according to claim 1, wherein the adapter has a mechanical securing action against a separation from the device, which is released only by destruction.

8. The adapter according to claim 1, wherein the at least one matching circuit includes a diagnostic circuit that tests a signal present at the first plug connector part and/or the second plug connector part.

9. The adapter according to claim 1, wherein the adapter includes multiple second plug connector parts, each for connection to one device.

10. The adapter according to claim 1, wherein the at least one matching circuit includes a control unit or regulating unit, which ascertains an actuating signal from a reference variable, which may be read into the control or regulating unit via the first plug connector part and provides the actuating signal to the second plug connector part.

11. The adapter according to claim 10, wherein the sensor element is electrically connected to the control or regulating unit, the control or regulating unit also ascertaining the actuating signal as a function of the sensor signal.

12. An adapter comprising:

a first plug connector part for electrical and mechanical connection to a cable;

a second plug connector part for electrical and mechanical connection to an electrical and/or electronic device;

a housing, the first and second plug connector parts are provided in or on a wall of the housing or are part of the housing; and at least one matching circuit connected to contacts of the first and second plug connector parts via electrical lines, wherein the housing is sealed, and the second plug connector part includes sealing elements that seal a complementary plug connector part of the electrical and/or electronic device connected to the second plug connector part against the surroundings, and wherein the adapter includes a pressure compensating element or a diaphragm inserted into a housing wall or a pressure compensating cavity.

13. An arrangement comprising:

an adapter comprising a first plug connector part for electrical and mechanical connection to a cable, a second plug connector part, a housing with the first and second plug connector parts being provided in or on a wall of the housing or are part of the housing, and at least one matching circuit connected to contacts of the first and second plug connector parts via electrical lines; and an electrical and/or electronic device that includes a first device plug connector part in or on a housing wall of a device housing of the device, wherein the electrical and/or electronic device is a sensor or an actuator, and wherein the first device plug connector part of the electrical and/or electronic device is electrically and mechanically connected to the second plug connector part of the adapter.

14. The arrangement according to claim 13, further comprising the cable, the cable including a cable plug connector part, the cable plug connector part of the cable being electrically and mechanically connected to the first plug connector part of the adapter.

* * * * *